US009765162B2

(12) United States Patent
Kim et al.

(10) Patent No.: US 9,765,162 B2
(45) Date of Patent: Sep. 19, 2017

(54) APPARATUS AND METHOD FOR REMOVING HALOGENS GENERATED DURING PREPARATION OF POLYBUTENE

(71) Applicant: DAELIM INDUSTRIAL CO., LTD., Seoul (KR)

(72) Inventors: Myeong Seok Kim, Sejong (KR); Min Sup Park, Daejeon (KR); Hyung Jae Seo, Daejeon (KR); Se Hyun Lee, Daejeon (KR)

(73) Assignee: DAELIM INDUSTRIAL CO., LTD., Seoul (KR)

( * ) Notice: Subject to any disclaimer, the term of this patent is extended or adjusted under 35 U.S.C. 154(b) by 0 days.

(21) Appl. No.: 14/914,556

(22) PCT Filed: Aug. 28, 2014

(86) PCT No.: PCT/KR2014/007996
§ 371 (c)(1),
(2) Date: Feb. 25, 2016

(87) PCT Pub. No.: WO2015/030489
PCT Pub. Date: Mar. 5, 2015

(65) Prior Publication Data
US 2016/0208029 A1   Jul. 21, 2016

(30) Foreign Application Priority Data

Aug. 28, 2013   (KR) .................. 10-2013-0102557

(51) Int. Cl.
*C08F 10/00*   (2006.01)
*C08F 110/00*   (2006.01)
(Continued)

(52) U.S. Cl.
CPC ............ *C08F 110/08* (2013.01); *B01D 3/009* (2013.01); *B01J 19/18* (2013.01); *C08F 6/00* (2013.01); *B01J 2219/24* (2013.01)

(58) Field of Classification Search
CPC ...... C08F 10/10; C08F 110/10; C08F 210/10; C08F 6/08; C08F 6/02; C08F 6/00
See application file for complete search history.

(56) References Cited

U.S. PATENT DOCUMENTS

| | | | | |
|---|---|---|---|---|
| 4,142,039 A | * | 2/1979 | Le Brasseur | ............. C08F 6/02 526/351 |
| 4,430,488 A | * | 2/1984 | Zboril | ....................... C08F 6/02 524/398 |
| 5,739,267 A | * | 4/1998 | Fujisawa | ................... C08F 6/02 525/333.7 |

(Continued)

FOREIGN PATENT DOCUMENTS

| | | |
|---|---|---|
| JP | 61-51009 A | 3/1986 |
| KR | 10-2001-0042872 A | 5/2001 |

(Continued)

OTHER PUBLICATIONS

International Preliminary Report on Patentability issued in International application No. PCT/KR2014/007996 dated Mar. 1, 2016.

*Primary Examiner* — Rip A Lee
(74) *Attorney, Agent, or Firm* — Nath, Goldberg & Meyer; Joshua B. Goldberg; Tanya E. Harkins (57) ABSTRACT

Disclosed are an apparatus and a method for removing halogens generated during the preparation of polybutene, which are capable of improving the utilization of polybutene and light polymers by removing halogen components contained in the polybutene and the light polymers. The method for removing halogens generated during the preparation of polybutene comprises the steps of: preparing a reaction product by supplying a catalyst and a reaction raw material to a reactor and polymerizing; removing a catalyst component from the reaction product and neutralizing; separating the reaction product into an organic compound and impurities comprising the catalyst component; heating the organic compound to distill an unreacted material; and removing a halogen component in a remaining polymerization mixture after the distillation using a halogen removing catalyst, or removing a halogen component in polybutene and light polymers obtained from the polymerization mixture using the halogen removing catalyst.

7 Claims, 1 Drawing Sheet

(51) Int. Cl.
*C08F 210/00* (2006.01)
*C08F 110/08* (2006.01)
*C08F 6/00* (2006.01)
*B01D 3/00* (2006.01)
*B01J 19/18* (2006.01)

(56) References Cited

U.S. PATENT DOCUMENTS

| | | | | |
|---|---|---|---|---|
| 6,084,144 | A * | 7/2000 | Takashima | B01J 27/32 |
| | | | | 585/465 |
| 6,300,444 | B1 * | 10/2001 | Tokumoto | C08F 6/001 |
| | | | | 526/237 |
| 6,441,110 | B1 | 8/2002 | Sigwart et al. | |
| 6,462,151 | B1 * | 10/2002 | Takashima | C08F 6/02 |
| | | | | 208/262.1 |
| 6,476,284 | B1 * | 11/2002 | Ohashi | C08F 8/26 |
| | | | | 208/262.1 |
| 6,518,373 | B1 * | 2/2003 | Sandrock | C08F 6/02 |
| | | | | 526/237 |
| 6,939,943 | B2 * | 9/2005 | Wettling | C08F 6/02 |
| | | | | 526/209 |
| 2007/0208151 | A1 * | 9/2007 | Okada | C08F 6/02 |
| | | | | 526/226 |
| 2016/0130377 | A1 * | 5/2016 | Kim | C08F 110/10 |
| | | | | 526/209 |
| 2016/0176994 | A1 * | 6/2016 | Kim | B01J 19/24 |
| | | | | 526/68 |

FOREIGN PATENT DOCUMENTS

| | | | |
|---|---|---|---|
| KR | 10-0362545 | B1 | 11/2002 |
| WO | 2005/066220 | A1 | 7/2005 |

\* cited by examiner

APPARATUS AND METHOD FOR REMOVING HALOGENS GENERATED DURING PREPARATION OF POLYBUTENE

TECHNICAL FIELD

The present invention relates to an apparatus and a method for removing halogens, and more particularly to an apparatus and a method for removing halogens generated during the preparation of polybutene, by which halogen components included in polybutene and light polymers may be removed and the utilization of the polybutene and the light polymers may be increased.

BACKGROUND ART

Polybutene is generally obtained by polymerizing olefin components with carbon number 4 (C4) derived during cracking of naphtha using a Friedel-Craft type catalyst and has a number average molecular weight (Mn) of about 300 to about 5,000. Raw materials used include isobutene with high purity, C4 raffinate-1 and a butane-butene fraction (B-B fraction). In the case where the isobutene with high purity used after diluting in a solvent of butanes is used as the raw materials, the content of the halogens in the polybutene and LP (or an isobutene oligomer, hereinafter will be referred to as light polymers) thus prepared is not high. However in the case where among the C4 material the C4-raffinate-1 remaining after the extraction of 1,3-butadiene, and the butane-butene fraction which is a C4 mixture derived during purifying crude oil, etc., are used as the raw materials, the content of the halogens in the polybutene and the light polymers thus prepared is high. In the C4-raffinate-1 and the butane-butene fraction, paraffin of isobutene and normal butane, and olefin of 1-butene, 2-butene, 30 to 50 wt % of isobutene, etc. are included, and the halogen content therein is high under the influence of the 1-butene. Particularly, in the light polymers produced as a by-product during preparing polybutene by polymerizing the above materials, hundreds to thousands ppm of organic halogens from a Friedel-Craft catalyst are present. Due to the organic halogens, the direct use of the light polymers as a fuel additive, a friction modifier, a non-aromatic organic solvent or the additive of cosmetics is difficult, and the light polymers including a halogen component is discarded or sold as a fuel oil at low price.

Light polymers generated during polymerizing polybutene is generally composed of an auxiliary cocatalyst of ethers, a compound with carbon number 4, which does not participate in the polymerization, and a material of C8, C12, C16, C20, C24, C28 or more, and has a viscosity of 3 cSt at a temperature of 40° C. According to the catalyst used, organic halogens in which chlorine or fluorine is combined are included in a ratio of 100 to 2,000 ppm. When the organic halogens are added to a fuel, an engine may be corroded, and environmental contamination may be induced due to exhaust fumes. In addition, the use as an additive to a non-aromatic organic solvent and cosmetics may be impossible. On the contrary, the use of the light polymers may become diverse if halogens are removed therefrom. After the fractional distillation of the light polymers from which halogens are removed, an organic material of C8 to C20 may be used as a non-aromatic organic solvent or an alkylating agent. A heavy organic material with C24 or more is light polybutene having a large molecular weight and a relatively high viscosity and is used as an additive to fuel to act as a friction modifier. In addition, when double bonds in the heavy organic material with C24 or more in the light polymers are removed by a hydrogen addition reaction, a harmless liquid type polymer capable of being used to human may be obtained, and may be used as the additive of cosmetics. According to another method, in order to increase the yield of polybutene having a low molecular weight of about 300 to about 400, an organic material with about C8 is removed, and a polymerization reaction may be performed using light polymers with C12 or more under a solid acid catalyst. By the polymerization reaction, the molecular weight, the viscosity and the polymer portion of the light polymers may increase, and a compound having a molecular weight capable of being used as a fuel additive (friction modifier) and the additive of cosmetics with high value may be obtained.

When polybutene having a low molecular weight of 300 to 400 is prepared in a conventional plant, production cost may increase due to low catalyst yield and low production yield, and profit creation may be difficult. Accordingly, the production and sales thereof may be difficult in consideration of common polybutene. Therefore, the production of polybutene having a low molecular weight by distilling light polymers from which halogens are removed, or the production of polybutene having a low molecular weight by a polymerization reaction under a solid acid catalyst according to the present invention may be greatly effective.

U.S. Pat. No. 6,300,444 discloses a method of removing fluorine by further distilling light polymers including a large amount of fluorine under a reduced pressure to prepare highly reactive polybutene having a low fluorine content. However, according to the method, the fluorine present in the light polymers is not removed, but the light polymers itself is removed via the distillation under a reduced pressure with a high vacuum degree of 2 torr. U.S. Pat. No. 6,476,284 discloses a preparation method of highly reactive polybutene having a vinylidene content of 60% or more and a halogen content of less than 40 ppm, wherein the polybutene is treated using an inorganic solid including an aluminum element. However, with actual application, the amount (mileage) of polybutene treated per unit amount of aluminum inorganic solid is small, and application to a plant is impossible. In addition, the rearrangement of the vinylidene is inevitable. U.S. Pat. No. 6,441,110 discloses a method of preparing highly reactive polybutene using a catalyst of group 3, 4, 5 and 6 without halogens to basically prevent the inclusion of a halogen component, however the catalyst is not commercially available yet. In addition, PCT application No. WO 2005/066220 discloses a method of removing halogens by preparing highly reactive polybutene having a vinylidene content of 50 mol % or more and a molecular weight of 400 to 50,000, removing water to a degree of 10 ppm or less using zeolite, and making contact with the zeolite again. However, since the life of the catalyst is short, the method of removing fluorine using the zeolite could not be used in a commercially used plant, either.

As described above, according to the conventional methods of removing halogens in polybutene and light polymers, the light polymers themselves are removed at a high temperature under a high vacuum degree during preparing polybutene, or the halogen content in a product is decreased or removed via contact with a solid such as an aluminum compound and zeolite. The method of removing the light polymers themselves confronts the present invention, and the method of contacting with the solid such as the aluminum compound and the zeolite is appropriate for batch type removal, however has limitation in continuous removal of halogens when applied to a petrochemical plant. According to this method, silicon (Si) and aluminum (Al) constituting the aluminum compound or the zeolite make contact with an organic halogen at a high temperature and remove halogen from the surface of the solid to form aluminum halogen (AlX) or silicon halogen (SiX), and effects are incomplete.

As described above, in the preparation of polybutene, a large amount of halogens are included in the polybutene thus prepared and in the light polymers produced as a by-product, and the value may decrease and negative affects to human and natural environment may be induced. Accordingly, the use of the polybutene and the light polymers may be limited. Therefore, the removal of halogen from the polybutene and the light polymers is essential to increase the value, to use diversely and not to do harm to human and natural environment.

DISCLOSURE

Technical Problem

An object of the present invention is to provide an apparatus and a method for removing halogens generated during preparation of polybutene to increase the utilization of the polybutene and the light polymers by removing halogens included in the polybutene and the light polymers generated during preparing the polybutene.

Another object of the present invention is to provide an apparatus and a method for removing halogens to attain high value and do no harm to human and natural environment by removing the halogens included in polybutene and light polymer.

A further object of the present invention is to provide an apparatus and a method for removing halogens, applicable to a plant by improving the amount (mileage) of polybutene capable of treating per unit amount of a catalyst.

Technical Solution

To achieve these and other advantages, there is provided in the present invention a method for removing halogens generated during preparation of polybutene, including preparing a reaction product by supplying a catalyst and a reaction raw material to a reactor and polymerizing; removing a catalyst component from the reaction product and neutralizing; separating the reaction product into an organic compound and impurities including the catalyst component; heating the organic compound to distill an unreacted material; and removing a halogen component in a remaining polymerization mixture after the distillation using a halogen removing catalyst, or removing a halogen component in polybutene and light polymers obtained from the polymerization mixture using the halogen removing catalyst.

To achieve these and other advantages, there is provided in the present invention an apparatus for removing halogens generated during preparation of polybutene, wherein the apparatus comprises: a reactor, into which a catalyst and a reaction raw material are supplied and polymerized to produce a reaction product; a neutralizing/washing bath for removing the catalyst from the reaction product and neutralizing the reaction product; a separating bath for separating the reaction product into an organic compound and impurities comprising the catalyst component; a C4 distillation column for distilling an unreacted material among the organic compound; and a halogen removing column for removing a halogen component in a remaining polymerization mixture after the distillation using the halogen removing catalyst, or removing a halogen component in polybutene and light polymers obtained from the polymerization mixture using the halogen removing catalyst.

Effect of Invention

According to the apparatus and the method for removing halogens generated during preparation of polybutene, the utilization of polybutene and light polymers may be increased by removing halogens included in the polybutene and the light polymers generated during preparing polybutene. In case of using polybutene from which halogens are removed as a fuel additive, a lubricant additive, the raw material of cosmetics, and a building material, harmless to human and eco-friendly products may be prepared. Particularly, the light polymers from which halogens are removed may be used as the fuel additive and play the role of a friction modifier, and may be used in a product with high price such as a non-aromatic organic solvent and the additive of cosmetics. In addition, catalyst mileage may be improved and the application thereof to a plant may be easy.

DETAILED DESCRIPTION OF THE INVENTION

Hereinafter, the present invention will be explained in detail referring to an attached drawing.

Figure 1:
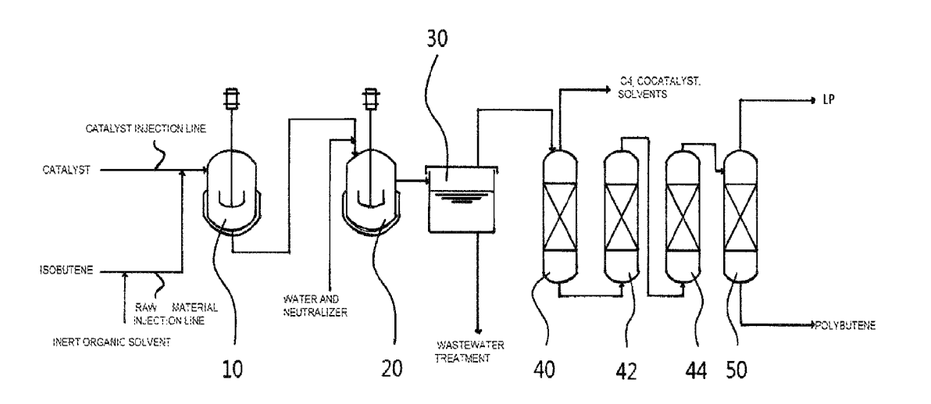
FIG. 1 is a schematic diagram illustrating an apparatus for removing halogens generated during preparation of polybutene according to an embodiment of the present invention.

The apparatus for removing halogens generated during preparation of polybutene according to the present invention includes, as shown in FIG. 1, (a) a reactor 10, (b) a neutralizing and washing bath 20, (c) a separating bath 30, (d) a C4 distillation column 40, and (e) a halogen removing column 42, and further includes a halogen acid adsorption column 44 and a light polymer (LP) distillation column 50.

To the (a) reactor 10, a catalyst supplied from a catalyst injection line and a reaction raw material such as isobutene supplied from a raw material injection line are supplied and polymerized to produce a reaction product. The reaction product drained through the bottom of the reactor 10 is supplied to the neutralizing and washing bath 20.

The catalyst is composed of a main catalyst, a cocatalyst and an auxiliary cocatalyst. The main catalyst includes a Lewis acid such as boron trifluoride, boron trichloride, aluminum trichloride and zinc chloride, the cocatalyst includes water or an alcohol compound, and the auxiliary cocatalyst includes an alkyl ether compound. The main catalyst may use a common Friedel-Craft type catalyst, without limitation, and the Lewis acid such as the boron trifluoride, the boron trichloride, the aluminum trichloride and zinc chloride may be used. However, the boron trifluoride and the aluminum trichloride, which derive terminal vinylidene well and have favorable commercial purpose are the most preferably used. The content of the boron trifluoride is 0.05 to 1 parts by weight, preferably, 0.1 to 1 parts by weight, and more preferably, 0.15 to 0.95 parts by weight on the basis of 100 parts by weight of the isobutene.

The cocatalyst is essential for the reaction and functions as a proton ($H^+$) donor for the initiation of the reaction. Water or an alcohol compound having 1 to 4 carbon atoms may be used, without limitation. The alcohol compound may include methanol, ethanol, propanol, isopropyl alcohol (isopropanol), butanol and isobutanol.

In addition, the auxiliary cocatalyst is for stabilizing the protons thus generated by the cocatalyst and for controlling reactivity and includes an alkyl ether ($R_1$—O—$R_2$) having 2 to 10 carbon atoms, without limitation. The alkyl ether may include dimethyl ether, diethyl ether, dipropyl ether, isopropyl sec-butyl ether, sec-butyl ether, isoamyl ether, isopropyl isoamyl ether and sec-butyl isoamyl ether.

Meanwhile, the injection of the catalyst is preferably an injection as a type that may easily control the quality of a product, and the main catalyst, the cocatalyst and the auxiliary catalyst may be selectively injected as a composite type of a mixture, or separately.

The reaction raw material supplied via the raw material injection line and used for preparing polybutene includes 10 wt % or more, preferably 25 to 70 wt % of isobutene and may be C4 raffinate-1 remaining after the extraction of 1,3-butadiene among C4 raw materials and a butane-butene fraction (B-B fraction), which is a C4 mixture derived during separating crude oil. In the raw material, paraffin such as isobutane and normal butane, or olefin such as 1-butene, 2-butene and 30 to 50 wt % of isobutene are included. In addition, isobutene with high purity may be used after diluting using an inert organic solvent. The inert organic solvent may be isobutane, normal butane, normal pentane, isopentane and hexane, and the isobutane and the normal butane, which have similar boiling points to that of isobutene and may be easily recycled after distilling are preferably used.

Referring to FIG. 1 again, in the (b) neutralizing and washing bath 20, water and a neutralizing agent injected from the transport line between the reactor 10 and the neutralizing and washing bath 20 are added to the reaction product drained from the reactor 10 to remove a catalyst component from the reaction product and neutralize. Impurities in the reaction product may be removed via washing. The reaction product from which the catalyst is removed and neutralized, is drained via the bottom of the separating bath 30. An organic compound remaining after removing the catalyst from the reaction product is drained via the top of the separation bath 30.

In the (c) separating bath 30, the reaction product is separated into an organic compound and impurities including a catalyst component using a layer separation principal. The impurities including the catalyst component washed in the neutralizing and washing bath 20 is drained via the bottom of the separating bath 30, and the organic compound remaining after removing the catalyst from the reaction product is drained via the top of the separating bath 30.

In the (d) C4 distillation column 40, materials such as an unreacted raw material, an inert organic solvent and a cocatalyst among the organic compounds injected from the separating bath 30 are distilled and drained via the top of the C4 distillation column 40. A remaining polymerization mixture is drained via the bottom of the C4 distillation column 40.

Next, (e) the halogen removing column 42 in the apparatus for removing halogens according to the present invention is for removing the halogen component in the polymerization mixture remaining after distillation in the C4 distillation column 40, or for removing the halogen component in the polybutene and the light polymers obtained from the polymer mixture. The polymerization mixture including a halogen acid type after removing the halogen component is drained via the top of the halogen removing column 42 and is supplied to the selective apparatus of the halogen acid adsorption column 44 or the light polymer (LP) distillation column 50, which will be described subsequently.

The halogen acid adsorption column 44, which may be additionally included as occasion demands, is for removing the halogen acid generated after removing the halogen component at the halogen removing column 42 using a halogen acid adsorbent filled in the halogen acid adsorption column 44. The polymer mixture from which the halogen acid is removed is supplied to a next apparatus via the top of the halogen acid adsorption column 44. In addition, the light polymer (LP) distillation column 50 is for obtaining light polymers and polybutene using the polymerization mixture from the halogen acid adsorption column 44. The light polymers are distilled and drained via the top of the light polymer (LP) distillation column 50 and transported to a light polymer (LP) storage, and the polybutene is drained to the bottom of the light polymer (LP) distillation column 50 and transported to a polybutene storage.

Meanwhile, the halogen component means the chemical bond of the raw material C4 and the main catalyst such as boron trifluoride ($BF_3$) with an organic product via a polymerization reaction, and the halogen acid is an HX type generated during removing the halogen component at the halogen removing column 42 and includes hydrogen fluoride (HF), hydrogen chloride (HCl), etc.

Then, the method for removing halogens generated during preparation of polybutene according to the present invention will be explained referring to FIG. 1. FIG. 1 referred to as the following preparation method is only a method for removing halogens generated during preparation of polybutene and does not include all of the present invention.

The method for removing halogens generated during preparation of polybutene according to the present invention includes a step of preparing a reaction product by supplying a catalyst and a reaction raw material to a reactor and polymerizing, a step of removing a catalyst component from the reaction product and neutralizing, a step of separating the reaction product into an organic compound and impurities including the catalyst component, a step of heating the organic compound to distill an unreacted material, and a step of removing a halogen component of the remaining polymerization mixture after the distillation using a halogen removing catalyst, or removing a halogen component of polybutene and light polymers obtained from the polymerization mixture using a halogen removing catalyst.

The method for removing halogens generated during preparation of polybutene will be explained in more detail. Catalysts such as a main catalyst, a cocatalyst and an auxiliary cocatalyst, and a reaction raw material such as isobutene are supplied to the reactor 10 and polymerized to produce a reaction product. In this case, the molecular weight and the vinylidene content of a product may be determined by controlling the reaction temperature, the intensity of the catalyst, the content of isobutene after the reaction, etc. To the neutralizing and washing bath 20, water and neutralizing agent injected from the transport line between the reactor 10 and the neutralizing and washing bath 20 are added, and the catalyst component is removed from the reaction product via washing and neutralized to remove impurities in the reaction product. After that, the reaction product transported to the separating bath 30 is separated into an organic compound and impurities including a catalyst component using a layer separation principal, impurities including the catalyst component is discarded as wastewater, and the organic compound is drained and supplied to the C4 distillation column 40. In the C4 distillation column 40, the organic compound injected from the separating bath 30 is heated to distill and exhaust an unreacted raw material such as isobutene, an inert organic solvent such as isobutane and normal butane, the cocatalyst, the auxiliary cocatalyst, etc. A polymerization mixture remaining after the distillation is transported to the halogen removing column 42. Then, in the halogen removing column 42, the halogen component of the polymerization mixture remaining after the distillation in the C4 distillation column 40 may be removed using a halogen removing catalyst such as iron halide filled in the halogen removing column 42, or the halogen component of the polybutene and the light polymers obtained from the polymerization mixture may be removed using a halogen removing catalyst such as iron halide filled in the halogen removing column 42. The halogen content of the polymerization mixture or the polybutene and the light polymers after reacting with the halogen removing catalyst at a temperature of 50 to 250° C., preferably, 70 to 230° C., and more preferably, 100 to 200° C., may be less than 50 ppm, preferably, less than 30 ppm, and more preferably, less than 20 ppm. The polymerization mixture remaining after removing the halogen component is supplied to the halogen acid adsorption column 44 or the light polymer (LP) distillation column 50, which may be further included as occasion demands.

Meanwhile, the halogen removing catalyst filled in the halogen removing column 42 for removing the halogen component is iron halide such as ferrous chloride ($FeCl_2$), ferric chloride ($FeCl_3$), ferrous fluoride ($FeF_2$) and ferric fluoride ($FeF_3$), and the iron halide is required to be processed into a powder type, a spherical type, a cylindrical type, a tablet type, etc. so as to be easily applied to a fixed bed reactor. The diameter is 0.1 to 100 mm, preferably, 0.5 to 97 mm, and more preferably, 1 to 95 mm. In this case, the processing may be performed using an inorganic binder of an aluminum type, a silicon type, kaolin, bentonite, etc., or an organic binder such as polyethylene glycol, polyvinyl alcohol, cellulose, wax, etc. The halogen removing catalyst may be used by a method of filling the iron halide catalyst alone in the halogen removing column 42, by dissolving the iron halide in water and impregnating in a solid acid such as aluminum oxide ($Al_2O_3$), zeolite, clay, etc., or by simply mixing the iron halide with the solid acid of the aluminum oxide, the zeolite, the clay, etc. The same effects and results may be obtained by the methods. The operating temperature of the halogen removing column 42 may be 100 to 250° C., preferably, 120 to 200° C., and more preferably, 150 to 200° C.

The catalyst used for preparing polybutene includes mostly boron trifluoride and aluminum trichloride. In the case of using the two catalysts, the decrease of the halogen content (including light polymers as a by-product) in a product is limited. Accordingly, a method of removing halogens by making contact of the iron halide catalyst with polybutene and light polymers at a high temperature is essential. The method of using the iron halide is not a finite method, by which a substituted type is removed. However, the iron halide makes catalytic action, and halogens making chemical bonding to the polybutene and the light polymers may be removed as a halogen acid type. Accordingly, the life of the halogen removing catalyst may be extended. According to the iron halide compound catalyst used for removing halogens generated during preparation of polybutene, catalyst life may be extended by 10 times or more when compared to the conventional invention using only aluminum oxide, zeolite, etc.

The method for removing halogens generated during preparation of polybutene will be explained. In the halogen acid adsorption column 44, which may be further included as occasion demands, halogen acids produced after removing each halogen component in the polymerization mixture, the polybutene and the light polymers in the halogen removing column 42, are removed using a halogen acid adsorbent filled in the halogen acid adsorption column 44. Halogen ion (X−), for example, fluorine ion (F−) is removed via the bonding with a metal component in the halogen acid adsorbent. In addition, in the light polymer (LP) distillation column 50, the light polymers and the polybutene may be obtained using the polymerization mixture from the halogen acid adsorption column 44. The light polymers are distilled, drained and transported to the light polymer (LP) storage, and the polybutene is also transported to a polybutene storage. The number average molecular weight (Mn) of the light polymers is from 100 to less than 300.

Meanwhile, the halogen adsorbent filled in the halogen acid adsorption column 44 includes, for example, calcium hydroxide ($Ca(OH)_2$), calcium oxide (CaO), calcium carbonate ($CaCO_3$), calcium chloride ($CaCl_2$), potassium hydroxide (KOH), potassium carbonate ($K_2CO_3$), potassium bicarbonate ($KHCO_3$), potassium chloride (KCl), sodium hydroxide (NaOH), sodium carbonate ($Na_2CO_3$), sodium bicarbonate ($NaHCO_3$), solid silica, solid alumina, a strongly basic anion exchange resin, a strongly acidic cation exchange resin, etc. Among the compounds, the calcium hydroxide, the calcium oxide, the calcium carbonate, the calcium chloride, the solid silica, the solid alumina and the resins, which may form insoluble salts in water may be preferably used.

The halogen acid adsorbent is required to be filled with an appropriate size so as to be easily applied to a tube shape fixed bed reactor to which a catalyst is fixed and through which a target material to be reacted is flown. The particle size (diameter) is 0.1 to 100 mm, preferably, 0.5 to 100 mm, and more preferably, 1 to 95 mm. If the halogen acid adsorbent has a diameter less than 0.1 mm and minute powder particles, the application thereof to the tube shape fixed bed reactor may be difficult, and if the diameter of the particles is greater than 100 mm, adsorption efficiency may be largely deteriorated. In addition, the particles of the adsorbent are required to be processed (molded) into a certain type, for example, spherical type, a cylinder type, a tablet type, etc. Among the types, the spherical type is the most preferable. Of course, with a continuous stirred-tank reactor (CSTR), which is a mixed flow reactor (MFR) type, all types of the catalysts may be used, however a minute powder may frequently remain in the reactor, and the CSTR is not appropriate as a reactor type.

Meanwhile, polybutene is classified as highly reactive polybutene, moderately reactive polybutene and common polybutene (hereinafter, will be referred to as non-reactive polybutene). The highly reactive polybutene has the content of vinylidene at the end of a molecule of greater than 70%, preferably, 71 to 99%, more preferably, 75 to 95%, and the most preferably, 80 to 95%. The moderately reactive polybutene has the content of vinylidene at the end of a molecule of 40 to 70%, preferably, 41 to 69%, and more preferably, 45 to 65%. The non-reactive polybutene has the content of vinylidene at the end of a molecule of less than 40%, preferably, 1 to 39%, and more preferably, 5 to 35%. In addition, the reactive polybutene and the non-reactive polybutene prepared by polymerization commonly have a number average molecular weight (Mn) of 300 to 5,000.

The polymerization of the highly reactive polybutene and the moderately reactive polybutene may be performed under common reaction conditions, for example, at a temperature of −40 to 20° C., and preferably, −35 to 10° C., with a pressure of 3 kg/cm² or more, and preferably, 2.5 to 10 kg/cm² so that reaction materials maintain a liquid state, for a retention time of 5 to 100 minutes, and preferably, 10 to 45 minutes in consideration of the costs. In addition, the conversion ratio of isobutene during polymerization of the polybutene may be 70% or more, and preferably, 80 to 95%.

The polymerization of the non-reactive polybutene may be performed under common reaction conditions, for example, at a temperature of −20 to 60° C., and preferably, −10 to 50° C., with a pressure of 3 kg/cm² or more, and preferably, 2.5 to 10 kg/cm² so that reaction materials maintain a liquid state, for a retention time of 5 to 100 minutes, and preferably, 10 to 45 minutes in consideration of the costs. In addition, the conversion ratio of isobutene during polymerization of the polybutene may be 70% or more, and preferably, 90 to 95%.

As described above, by using the apparatus and the method for removing halogens generated during preparation of polybutene according to the present invention, halogens are rarely included in the polybutene and the light polymers thus prepared. Accordingly, the polybutene may be used to form eco-friendly products, and the light polymers as a by-product may be used as a fuel additive to play the role of a friction modifier and may be applied to products with high value such as non-aromatic organic solvents or the additive of cosmetics. The effects are considerably a lot. In addition, the removal of halogens from a large amount of polymerization mixture or polybutene and light polymers may be possible due to the improvement of the mileage of the halogen removing catalyst.

MODE FOR CARRYING OUT THE INVENTION

Hereinafter, the present invention will be explained in more detail referring to preferred embodiments. The following embodiments are for illustrating the present invention, and the present invention is not limited to the following embodiments.

[Preparation Example 1] Preparation of Impregnation Catalyst Filled in Halogen Removing Column To a saturated aqueous solution in which 68 g of $FeCl_2$ was dissolved in 100 ml of water, 30 g of natural zeolite was added. After about 1 hour, the mixture thus obtained was filtered under a reduced pressure, dried under a nitrogen atmosphere at a temperature of 150° C. for 3 hours to prepare a natural zeolite catalyst impregnated with about 5% of $FeCl_2$. Then, the catalyst was stored in a desiccator.

[Preparation Example 2] Preparation of Another Impregnation Catalyst Filled in Halogen Removing Column To a saturated aqueous solution in which 12.9 g of $FeCl_2$ was dissolved in 100 ml of water, 30 g of natural zeolite was added to produce a mixture. Water in the mixture was distilled and removed using a rotary evaporator. The product thus obtained was dried under a nitrogen atmosphere at a temperature of 150° C. for 3 hours to prepare a natural zeolite catalyst impregnated with about 30% of $FeCl_2$. The catalyst was stored in a desiccator.

[Example 1] Polymerization of Highly Reactive Polybutene Having Molecular Weight of 2,300 in Case of Using Halogen Removing Column Filled with $FeCl_2$ Catalyst While maintaining the temperature of a reactor to −29° C., a composite catalyst in which the molar ratio of isopropanol (cocatalyst)/boron trifluoride (main catalyst) was 1.6 and C4-raffinate-1 which was a material having the components shown in the following Table 1 were injected to the reactor and polymerized. The pressure of the reactor was maintained to 3 kg/cm² or more so that raw materials maintained a liquid phase, an average retention time was set to 45 minutes, and the amount of the catalyst was controlled so that the amount of the boron trifluoride was 0.27 parts by weight relative to 100 parts by weight of the isobutene. After 180 minutes, the reaction product drained from the reactor was mixed with 5 wt % of a caustic soda solution (neutralizer), and transported to a neutralizing and washing bath. The reaction was stopped and the catalyst was removed. Then, wastewater including the removed catalyst was transported to a separating bath and drained via the bottom of the separating bath. The organic compound remaining after removing the catalyst among the reaction product was drained via the top of the separating bath and injected to a C4 distillation column. The organic compound injected to the C4 distillation column was heated to 100° C., and unreacted isobutene, a cocatalyst, solvents (C4), etc. in the organic compound were distilled and removed via the top of the C4 distillation column. After that, a remaining polymerization mixture in which the amount of fluorine among the organic compound was 299 ppm passed through a halogen removing column in which 5 g of $FeCl_2$ (halogen removing catalyst) was filled, by 40 g per hour at 200° C. to remove fluorine included in the remaining polymerization mixture. From the polymerization mixture passed through the halogen removing column, hydrogen fluoride (HF) generated at the halogen removing column was removed at the halogen acid adsorption column filled with calcium hydroxide ($Ca(OH)_2$) as a halogen acid adsorbent, and a remaining polymerization mixture was transported via the top of the halogen acid adsorption column to the light polymer (LP) distillation column. The remaining polymerization mixture supplied to the light polymer (LP) distillation column was heated under the conditions of 230° C. and 25 torr for 30 minutes, and the light polymers were distilled and drained via the top of the light polymer (LP) distillation column and transported to a light polymer (LP) storage, and the highly reactive polybutene was drained via the bottom of the light polymer (LP) distillation column and transported to a polybutene storage. The halogen removing catalyst worked for 2,420 hours, and the treatment amount of the polymer mixture (per 5 g of the halogen removing catalyst) was 96.8 kg (catalyst mileage=19,360). The molecular weight and polydispersity of the highly reactive polybutene were measured by gel permeation chromatography (GPC), vinylidene in the highly reactive polybutene was analyzed using C13-NMR, and the content of the vinylidene was 87.6%. When measuring the halogen content by an ion selective electrode (ISE) method, the fluorine content in the polybutene was 3 ppm, and the fluorine content in the light polymers was 5 ppm (Mn (number average molecular weight)=2,410, Pd (polydispersity)=1.8).

TABLE 1

|  | isobutene | n-butane | 1-butene | C-2-butene | T-2-butene | i-butene |
|---|---|---|---|---|---|---|
| Content (wt %) | 49.5 | 9.7 | 24.8 | 4.2 | 8.4 | 3.4 |

[Example 2] Polymerization of Highly Reactive Polybutene Having Molecular Weight of 1,000 in Case of Using Halogen Removing Column Filled with Impregnated Catalyst of Natural Zeolite with $FeCl_2$ While maintaining the temperature of a reactor to −19° C., a composite catalyst in which the molar ratio of isopropanol/boron trifluoride was 1.75 and C4-raffinate-1 which was a material having the components shown in the above Table 1 were injected to the reactor and polymerized. The pressure of the reactor was maintained to 3 kg/cm² or more so that raw materials maintained a liquid phase, an average retention time was set to 45 minutes, and the amount of the catalyst was controlled so that the amount of the boron trifluoride was 0.33 parts by weight relative to 100 parts by weight of the isobutene. In addition, the same polymerization procedure described in Example 1 was performed except that the fluorine content in the polymerization mixture passed through the C4 distillation column was 318 ppm, and the impregnation catalyst prepared in Preparation Example 1 was used as the halogen removing catalyst of the halogen removing column to produce a product. The halogen removing catalyst worked for 300 hours, and the treatment amount of the polymer mixture was 12 kg (catalyst mileage=2,400). The vinylidene content in the highly reactive polybutene was 88.8%, the fluorine content in the polybutene was 4 ppm, and the fluorine content in the light polymers was 6 ppm (Mn=970, Pd=1.28).

[Example 3] Polymerization of Highly Reactive Polybutene Having Molecular Weight of 750 in Case of Using Halogen Removing Column Filled with Impregnated Catalyst of Natural Zeolite with $FeCl_2$ While maintaining the temperature of a reactor to −19° C., a composite catalyst in which the molar ratio of isopropanol/boron trifluoride was 1.8 and C4-raffinate-1 which was a material having the components shown in the above Table 1 were injected to the reactor and polymerized. The pressure of the reactor was maintained to 3 kg/cm² or more so that raw materials maintained a liquid phase, an average retention time was set to 45 minutes, and the amount of the catalyst was controlled so that the amount of the boron trifluoride was 0.4 parts by weight relative to 100 parts by weight of the isobutene. In addition, the same polymerization procedure described in Example 1 was performed except that the fluorine content of the polymerization mixture passed through the C4 distillation column was 320 ppm, and the impregnation catalyst prepared in Preparation Example 2 was used as the halogen removing catalyst of the halogen removing column to produce a product. The halogen removing catalyst worked for 1,020 hours, and the treatment amount of the polymer mixture was 40.8 kg (catalyst mileage=8,160). The vinylidene content in the highly reactive polybutene was 88.2%, the fluorine content in the polybutene was 4 ppm, and the fluorine content in the light polymers was 7 ppm (Mn=770, Pd=1.23).

[Example 4] Polymerization of Highly Reactive Polybutene Having Molecular Weight of 1,000 in Case of Using Halogen Removing Column Filled with Simply Mixed Catalyst of Natural Zeolite and $FeCl_2$ While maintaining the temperature of a reactor to −19° C., a composite catalyst in which the molar ratio of isopropanol/boron trifluoride was 1.75 and C4-raffinate-1 which was a material having the components shown in the above Table 1 were injected to the reactor and polymerized. The pressure of the reactor was maintained to 3 kg/cm² or more so that raw materials maintained a liquid phase, an average retention time was set to 45 minutes, and the amount of the catalyst was controlled so that the amount of the boron trifluoride was 0.33 parts by weight relative to 100 parts by weight of the isobutene. In addition, the same polymerization procedure described in Example 1 was performed except that the fluorine content of the polymerization mixture passed through the C4 distillation column was 302 ppm, and a mixed catalyst of 95% (4.75 g) of natural zeolite and 5% (0.25 g) of $FeCl_2$ was used as the halogen removing catalyst of the halogen removing column to produce a product. The halogen removing catalyst worked for 310 hours, and the treatment amount of the polymer mixture was 12.4 kg (catalyst mileage=2,480). The vinylidene content in the highly reactive polybutene was 88.9%, the fluorine content in the polybutene was 3 ppm, and the fluorine content in the light polymers was 5 ppm (Mn=960, Pd=1.29).

[Example 5] Polymerization of Common Polybutene (Non-Reactive Polybutene) Having Molecular Weight of 2,400 in Case of Using Halogen Removing Column Filled with $FeCl_2$ Catalyst While maintaining the temperature of a reactor to 0° C., a catalyst prepared as a slurry state of aluminum trichloride and non-reactive polybutene having a molecular weight of 300 and C4-raffinate-1 which was a material having the components shown in the above Table 1 were injected to the reactor and polymerized. The pressure of the reactor was maintained to 3 kg/cm² or more so that raw materials maintained a liquid phase, an average retention time was set to 45 minutes, and the amount of the catalyst was controlled so that the amount of the aluminum trichloride was 0.014 parts by weight relative to 100 parts by weight of the isobutene. After 180 minutes, the reaction product drained from the reactor was mixed with 5 wt % of a caustic soda solution (neutralizer), and transported to a neutralizing and washing bath. The reaction was stopped and the catalyst was removed. Then, wastewater including the removed catalyst was transported to a separating bath and drained and removed via the bottom of the separating bath. The organic compound remaining after removing the catalyst among the reaction product was drained via the top of the separating bath and injected to a C4 distillation column. The organic compound injected to the C4 distillation column was heated to 100° C., and unreacted isobutene, solvents (C4), etc. in the organic compound were distilled and removed via the top of the C4 distillation column. After that, a remaining polymerization mixture in which the amount of chlorine in the organic compound was 460 ppm passed through a halogen removing column in which 5 g of $FeCl_2$ (halogen removing catalyst) was flown, by 40 g per hour at 200° C. to remove chlorine included in the remaining polymerization mixture. From the polymerization mixture passed through the halogen removing column, hydrogen chloride (HCl) generated at the halogen removing column was removed at the halogen acid adsorption column filled with calcium hydroxide ($Ca(OH)_2$) as a halogen acid adsorbent and transported via the top of the halogen acid adsorption column to the light polymer (LP) distillation column. The remaining polymerization mixture supplied to the light polymer (LP)

distillation column was heated under the conditions of at 230° C. and 25 torr for 30 minutes, and the light polymers were distilled and drained via the top of the light polymer (LP) distillation column and transported to a light polymer (LP) storage, and non-reactive polybutene was drained via the bottom of the light polymer (LP) distillation column and transported to a polybutene storage. The halogen removing catalyst worked for 1,580 hours, and the treatment amount of the polymer mixture was 63.2 kg (catalyst mileage=12,640). The chlorine content in the polybutene was 4 ppm, and the chlorine content in the light polymers was 7 ppm (Mn=2,450, Pd=1.88).

[Example 6] Polymerization of Highly Reactive Polybutene Having Molecular Weight of 1,000 in Case where Polybutene and Light Polymers Respectively Passed Through Two Halogen Removing Columns Filled with Impregnation Catalyst of Natural Zeolite with $FeCl_2$ While maintaining the temperature of a reactor to −19° C., a composite catalyst in which the molar ratio of isopropanol/boron trifluoride was 1.75 and C4-raffinate-1 which was a material having the components shown in the above Table 1 were injected to the reactor and polymerized. The pressure of the reactor was maintained to 3 kg/cm$^2$ or more so that raw materials maintained a liquid phase, an average retention time was set to 45 minutes, and the amount of the catalyst was controlled so that the amount of the boron trifluoride was 0.33 parts by weight relative to 100 parts by weight of the isobutene. After 180 minutes, the reaction product drained from the reactor was mixed with 5 wt % of a caustic soda solution (neutralizer), and transported to a neutralizing and washing bath. The reaction was stopped and the catalyst was removed. Then, wastewater including the removed catalyst was transported to a separating bath and drained and removed via the bottom of the separating bath. The organic compound remaining after removing the catalyst among the reaction product was drained via the top of the separating bath and injected to a C4 distillation column. The organic compound injected to the C4 distillation column was heated to 100° C., and unreacted isobutene, a cocatalyst, solvents (C4), etc. in the organic compound was distilled and removed via the top of the C4 distillation column. The remaining organic compound among the organic compound, that is, the remaining polymerization mixture was transported via the bottom of the C4 distillation column to the light polymer (LP) distillation column. The remaining polymerization mixture supplied to the light polymer (LP) distillation column was heated under the conditions of 230° C. and 25 torr for 30 minutes, and the light polymers were transported to the top of the light polymer (LP) distillation column, and the highly reactive polybutene was transported to the bottom of the light polymer (LP) distillation column. The fluorine content in the transported polybutene was 25 ppm, and the fluorine content in the light polymers was 330 ppm. The polybutene and the light polymers were respectively injected to two halogen removing columns each including 5 g of the impregnation catalyst prepared in Preparation Example 1 and passed therethrough by flowing 40 g per hour at 200° C. to remove fluorine included in the remaining polybutene and the light polymers. From the polybutene and the light polymers passed through each of the halogen removing columns, hydrogen fluoride (HF) generated at the halogen removing column was removed at the halogen acid adsorption column filled with calcium hydroxide (Ca(OH)$_2$) as a halogen acid adsorbent. The halogen removing catalyst for removing the halogens of the polybutene worked for 2,860 hours, and the treatment amount of the polybutene was 114.4 kg (catalyst mileage=22,880), and the halogen removing catalyst for removing the halogens in the light polymers worked for 290 hours, and the treatment amount of the light polymers was 11.6 kg (catalyst mileage=2,320). The vinylidene content in the polybutene was 88.5%, the chlorine contents in the polybutene and the light polymers finally obtained were 3 ppm and 5 ppm, respectively (Mn=960, Pd=1.32).

[Comparative Example 1] Polymerization of Highly Reactive Polybutene Having Molecular Weight of 2,300 in Case of Using Halogen Removing Column Filled with Activated Alumina Catalyst While maintaining the temperature of a reactor to −29° C., a composite catalyst in which the molar ratio of isopropanol/boron trifluoride was 1.6 and C4-raffinate-1 which was a material having the components shown in the above Table 1 were injected to the reactor and polymerized. The pressure of the reactor was maintained to 3 kg/cm$^2$ or more so that raw materials maintained a liquid phase, an average retention time was set to 45 minutes, and the amount of the catalyst was controlled so that the amount of the boron trifluoride was 0.27 parts by weight relative to 100 parts by weight of the isobutene. In addition, the same polymerization procedure described in Example 1 was performed except that the fluorine content of a polymerization mixture passed through the C4 distillation column was 311 ppm, the halogen removing column was filled with activated alumina (A-202HF, product of UOP Co.) as a halogen removing catalyst, and the polymerization mixture drained from the C4 distillation column was injected by 20 g per hour to the halogen removing column to produce a product. The halogen removing catalyst worked for 64 hours, and the treatment amount of the polymer mixture was 1.28 kg (catalyst mileage=256). The vinylidene content in the highly reactive polybutene was 87.4%, the fluorine content in the polybutene was 3 ppm, and the fluorine content in the light polymers was 5 ppm (Mn=2,350, Pd=1.83).

[Comparative Example 2] Polymerization of Highly Reactive Polybutene Having Molecular Weight of 1,000 in Case of Using Halogen Removing Column Filled with Zeolite Catalyst While maintaining the temperature of a reactor to −19° C., a composite catalyst in which the molar ratio of isopropanol/boron trifluoride was 1.75 and C4-raffinate-1 which was a material having the components shown in the following Table 1 were injected to the reactor and polymerized. The pressure of the reactor was maintained to 3 kg/cm$^2$ or more so that raw materials maintained a liquid phase, an average retention time was set to 45 minutes, and the amount of the catalyst was controlled so that the amount of the boron trifluoride was 0.33 parts by weight relative to 100 parts by weight of the isobutene. In addition, the same polymerization procedure described in Example 1 was performed except that the fluorine content of a polymerization mixture passed through the C4 distillation column was 298 ppm, and the halogen removing column was filled with zeolite as a halogen removing catalyst. The halogen removing catalyst worked for 30 hours, and the treatment amount of the polymer mixture was 1.2 kg (catalyst mileage=240). The vinylidene content in the highly reactive polybutene was 88.7%, the fluorine content in the polybutene was 3 ppm, and the fluorine content in the light polymers was 5 ppm (Mn=960, Pd=1.3).

[Comparative Example 3] Polymerization of Common Polybutene (Non-Reactive Polybutene) Having Molecular Weight of 2,400 in Case of Using Halogen Removing Column Filled with Zeolite Catalyst While maintaining the temperature of a reactor to 0° C., a catalyst prepared as a slurry state of aluminum trichloride and non-reactive polybutene having a molecular weight of 300 and C4-raffinate-1 which was a material having the components shown in the above Table 1 were injected to the reactor and polymerized. The pressure of the reactor was maintained to 3 kg/cm$^2$ or more so that raw materials maintained a liquid phase, an average retention time was set to 45 minutes, and the amount of the catalyst was controlled so that the amount of the aluminum trichloride was 0.014 parts by weight relative to 100 parts by weight of the isobutene. In addition, the same polymerization procedure described in Example 5 was performed except that the chlorine content of a polymerization mixture passed through the C4 distillation column was 440 ppm, and the halogen removing column was filled with zeolite as a halogen removing catalyst to obtain a product. The halogen removing catalyst worked for 21 hours, and the treatment amount of the polymer mixture was 0.84 kg (catalyst mileage=168). The chlorine content in the polybutene was 4 ppm, and the chlorine content in the light polymers was 7 ppm (Mn=960, Pd=1.35).

In the following Table 2, polymerization mixture treatment amount, catalyst mileage and halogen content before and after removing halogens contained in the polybutene and the light polymers during the removing process of halogens according to the catalysts for removing halogens in polybutene and light polymers prepared in Examples 1 to 6 and Comparative Examples 1 to 3 are summarized.

As shown in the above Table 2, it could be confirmed that the apparatus and the method for removing halogens according to the present invention had decreased halogen content and had improving effects of catalyst mileage for removing halogens as in commonly used methods (Comparative Examples 1 to 3).

As described above, if dehalogenation is performed using a halogen removing column filled with a halogen removing catalyst, halogens in light polymers as a by-product may be removed as well as in polybutene generated during preparation of polybutene. The polybutene may produce an eco-friendly product due to the decrease of halogens in the polybutene. Particularly, the light polymers may produce a product with high value, unlike the light polymers without removing halogens, which should be wasted or used as a fuel oil with low price. In addition, the halogen removing catalyst used in the present invention has a merit of long life capable of being applied to a plant when compared to a conventional catalyst. Frequent replacement of a catalyst may induce difficulty in petrochemical industry and may result considerable expense, and the present invention is more meaningful.

The invention claimed is:
1. A method for removing halogens generated during preparation of polybutene, the method comprising:
preparing a reaction product by supplying a catalyst and a reaction raw material to a reactor and polymerizing;
washing a catalyst component from the reaction product and neutralizing;
separating the reaction product into an organic compound and impurities comprising the catalyst component;
heating the organic compound to distill an unreacted material; and
removing a halogen component in a remaining polymerization mixture after the distillation using a halogen removing catalyst, or removing a halogen component

TABLE 2

| | Halogen removing catalyst | Mixture treatment amount (Kg)/ catalyst mileage | | Halogen content before treatment (ppm) | | Halogen content after treatment (ppm) | |
|---|---|---|---|---|---|---|---|
| | | Polybutene | LP | Polybutene | LP | Polybutene | LP |
| Example 1 | FeCl$_2$ | 96.8/19,360 | | 299 | | 3 | 5 |
| Example 2 | Impregnation catalyst (preparation example 1) | 12/2,400 | | 318 | | 4 | 6 |
| Example 3 | Impregnation catalyst (preparation example 2) | 40.8/8,160 | | 320 | | 4 | 7 |
| Example 4 | Mixture of zeolite 95% and FeCl$_2$ 5% | 12.4/2,480 | | 302 | | 3 | 5 |
| Example 5 | FeCl$_2$ | 63.2/12,640 | | 460 (Cl) | | 4 (Cl) | 7 (Cl) |
| Example 6 | Impregnation catalyst (preparation example 1) | 114.2/22,880 | 11.6/2,320 | 25 | 330 | 3 | 5 |
| Comparative Example 1 | Activated alumina | 1.28/248 | | 311 | | 3 | 5 |
| Comparative Example 2 | Zeolite | 1.2/240 | | 298 | | 3 | 5 |
| Comparative Example 3 | Zeolite | 0.84/168 | | 440 (Cl) | | 4 (Cl) | 7 (Cl) | in polybutene and light polymers obtained from the polymerization mixture using the halogen removing catalyst, wherein the halogen removing catalyst is iron halide selected from the group consisting of ferrous chloride ($FeCl_2$), ferric chloride ($FeCl_3$), ferrous fluoride ($FeF_2$) and ferric fluoride ($FeF_3$).

2. The method for removing halogens generated during preparation of polybutene according to claim 1, wherein a halogen content of the polymerization mixture or the light polymers after reaction with the halogen removing catalyst at 50 to 250° C. is less than 50 ppm.

3. The method for removing halogens generated during preparation of polybutene according to claim 1, wherein the form of the halogen removing catalyst is selected from the group consisting of a powder type, a spherical type, a cylindrical type and a tablet type, and the halogen removing catalyst is processed using an inorganic binder and an organic binder such that the diameter of the halogen removing catalyst is 0.1 to 100 mm.

4. The method for removing halogens generated during preparation of polybutene according to claim 1, wherein the halogen removing catalyst is obtained by dissolving iron halide in water and impregnating in aluminum oxide ($Al_2O_3$), zeolite, or clay, or by mixing the iron halide with aluminum oxide ($Al_2O_3$), zeolite, or clay.

5. The method for removing halogens generated during preparation of polybutene according to claim 1, further comprising removing halogen acid generated after removing the halogen component using a halogen acid adsorbent.

6. The method for removing halogens generated during preparation of polybutene according to claim 5, wherein the halogen acid adsorbent is 0.1 to 100 mm in the particle diameter, and the halogen acid adsorbent is selected from the group consisting of calcium hydroxide ($Ca(OH)_2$), calcium oxide (CaO), calcium carbonate ($CaCO_3$), calcium chloride ($CaCl_2$), potassium hydroxide (KOH), potassium carbonate ($K_2CO_3$), potassium bicarbonate ($KHCO_3$), potassium chloride (KCl), sodium hydroxide (NaOH), sodium carbonate ($Na_2CO_3$), sodium bicarbonate ($NaHCO_3$), solid silica, solid alumina, a strongly basic anion exchange resin and a strongly acidic cation exchange resin.

7. An apparatus for removing halogens generated during preparation of polybutene, the apparatus comprising:

a reactor, into which a catalyst and a reaction raw material are supplied and polymerized to produce a reaction product;

a neutralizing/washing bath for washing the catalyst from the reaction product and neutralizing the reaction product;

a separating bath for separating the reaction product into an organic compound and impurities comprising the catalyst component;

a C4 distillation column for distilling an unreacted material among the organic compound; and a halogen removing column for removing a halogen component in a remaining polymerization mixture after the distillation using the halogen removing catalyst, or removing a halogen component in polybutene and light polymers obtained from the polymerization mixture using the halogen removing catalyst;

wherein the halogen removing catalyst is iron halide selected from the group consisting of ferrous chloride ($FeCl_2$), ferric chloride ($FeCl_3$), ferrous fluoride ($FeF_2$) and ferric fluoride ($FeF_3$).

\* \* \* \* \*